United States Patent
Yilma

(10) Patent No.: US 8,864,172 B2
(45) Date of Patent: Oct. 21, 2014

(54) SEATBELT BUCKLE HEIGHT ADJUSTMENT MECHANISM

(71) Applicant: Ford Global Technologies, LLC, Dearborn, MI (US)

(72) Inventor: Benjamin Yilma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 13/676,504

(22) Filed: Nov. 14, 2012

(65) Prior Publication Data

US 2014/0132056 A1    May 15, 2014

(51) Int. Cl.
- B60R 22/20 (2006.01)
- B60R 22/26 (2006.01)
- B60R 22/18 (2006.01)

(52) U.S. Cl.
CPC .......... *B60R 22/20* (2013.01); *B60R 2022/208* (2013.01); *B60R 22/26* (2013.01); *B60R 2022/1806* (2013.01)
USPC .......................... 280/801.2; 180/268; 297/481

(58) Field of Classification Search
CPC ...... B60R 22/03; B60R 22/20; B60R 22/201; B60R 22/206; B60R 22/18; B60R 2022/1806; B60R 2022/021; B60R 2022/208; B60R 2022/20; B60R 2022/18; B60N 2/164; B60N 2/1635; B60N 2/16; B60N 2/1853; B60N 2/185

USPC ............ 280/801.2, 804, 801.1, 808; 180/268; 297/344.17, 344.13, 344.12, 468, 474, 297/481, 344.15, 344.16, 344.18; 701/45

See application file for complete search history.

(56) References Cited

U.S. PATENT DOCUMENTS

| | | | |
|---|---|---|---|
| 4,993,747 A * | 2/1991 | Borlinghaus | 280/806 |
| 5,207,480 A | 5/1993 | Johnson et al. | |
| 5,282,672 A * | 2/1994 | Borlinghaus | 297/468 |
| 6,581,969 B2 | 6/2003 | Nishide | |
| 6,969,088 B2 | 11/2005 | Wang | |
| 7,658,443 B2 | 2/2010 | Musale | |
| 2002/0043872 A1 | 4/2002 | Townsend et al. | |

* cited by examiner

*Primary Examiner* — Keith Frisby
(74) *Attorney, Agent, or Firm* — Vichit Chea; Price Heneveld LLP

(57) ABSTRACT

A telescoping seatbelt buckle design that improves seatbelt buckle accessibility and comfort by telescopingly adjusting the length of the seatbelt buckle assembly to maintain an optimal relationship between the seatbelt buckle position and the vehicle seat cushion position, wherein the telescoping seatbelt buckle assembly is adapted to maintain the optimal position of the seatbelt buckle relative to the vehicle seat cushion over a full range of seat height and seat track travels. Particularly, on a power seat, the telescoping seatbelt buckle assembly adjustment occurs passively as a vehicle occupant moves or adjusts the vehicle seat height or tilt using the seat controller switches, as the telescoping seatbelt buckle assembly is coupled to a motor used to adjust the vehicle seat position.

17 Claims, 6 Drawing Sheets

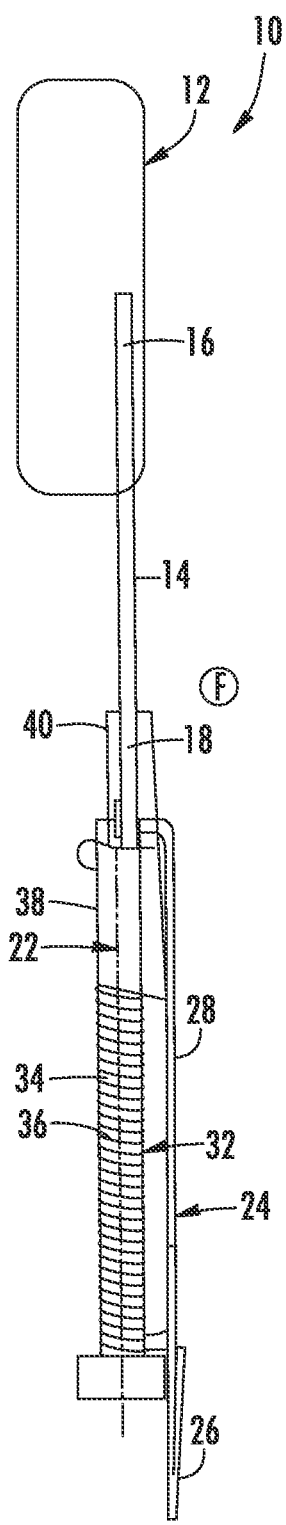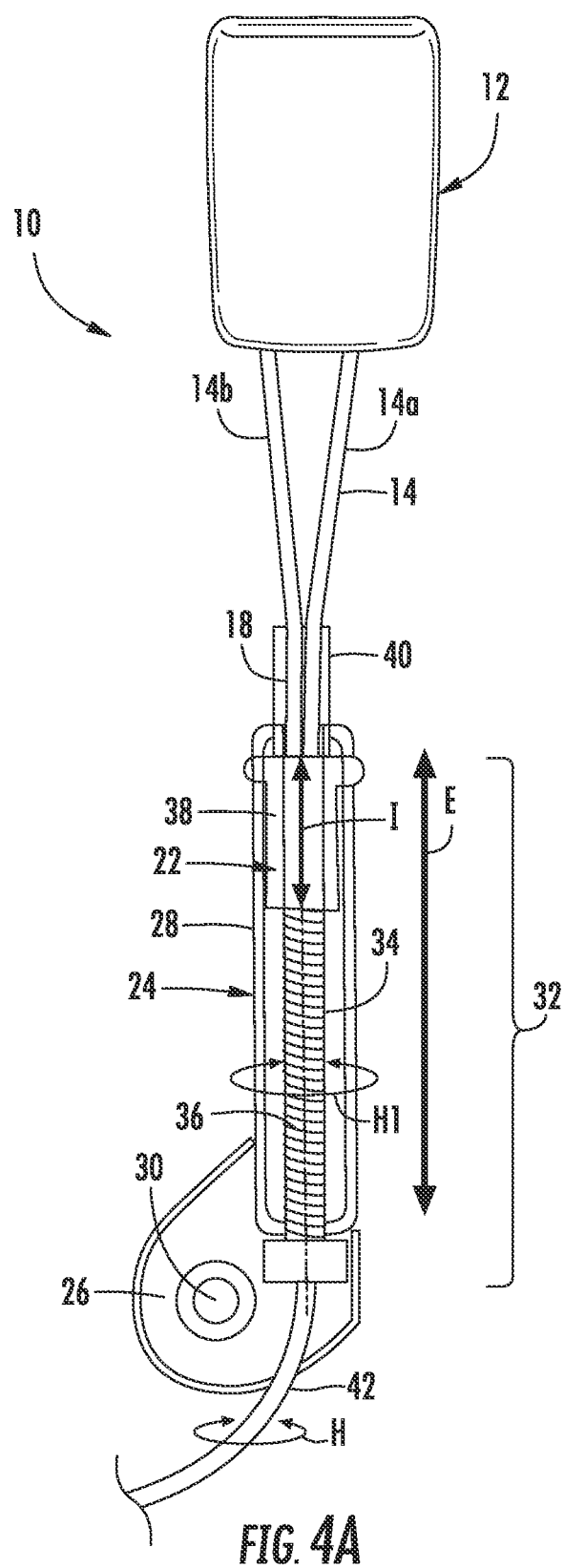
FIG. 4
FIG. 4A

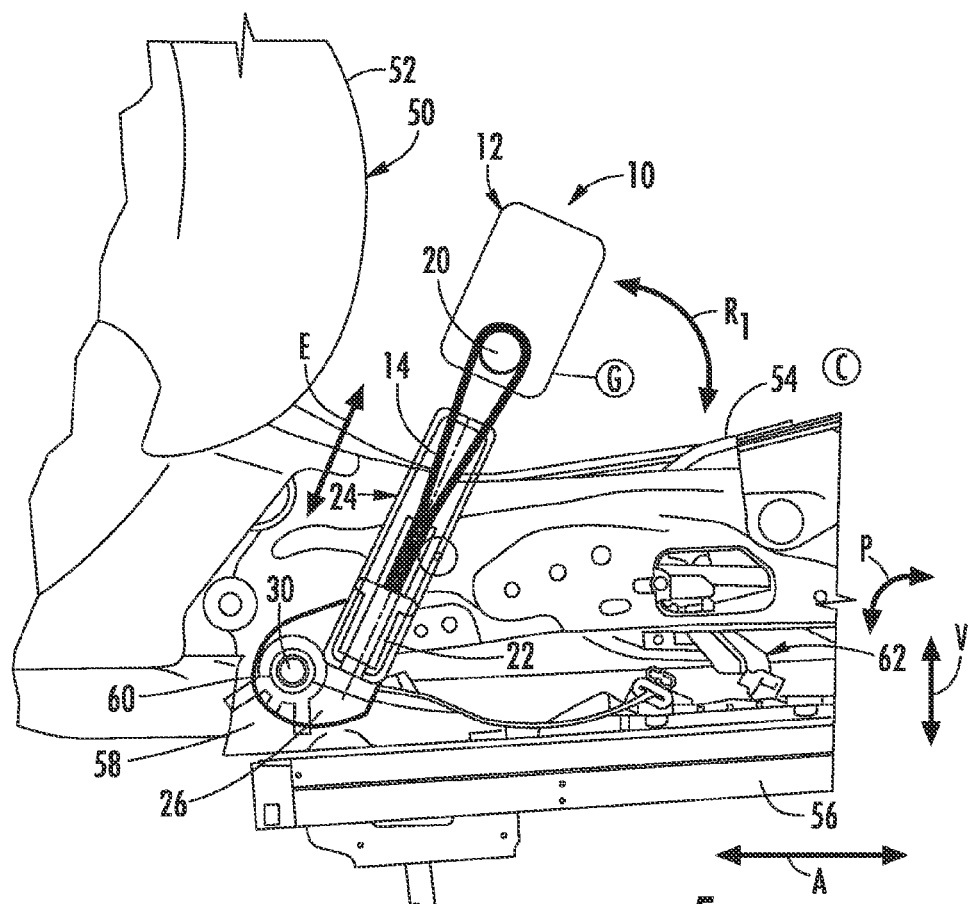
FIG. 5
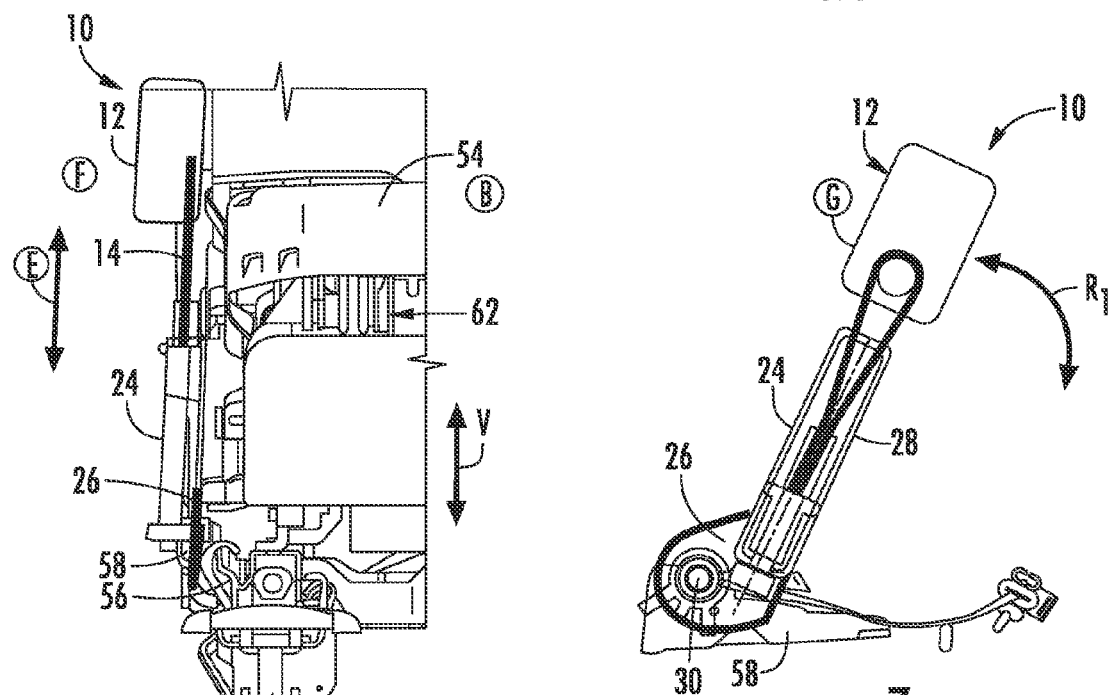
FIG. 6
FIG. 7

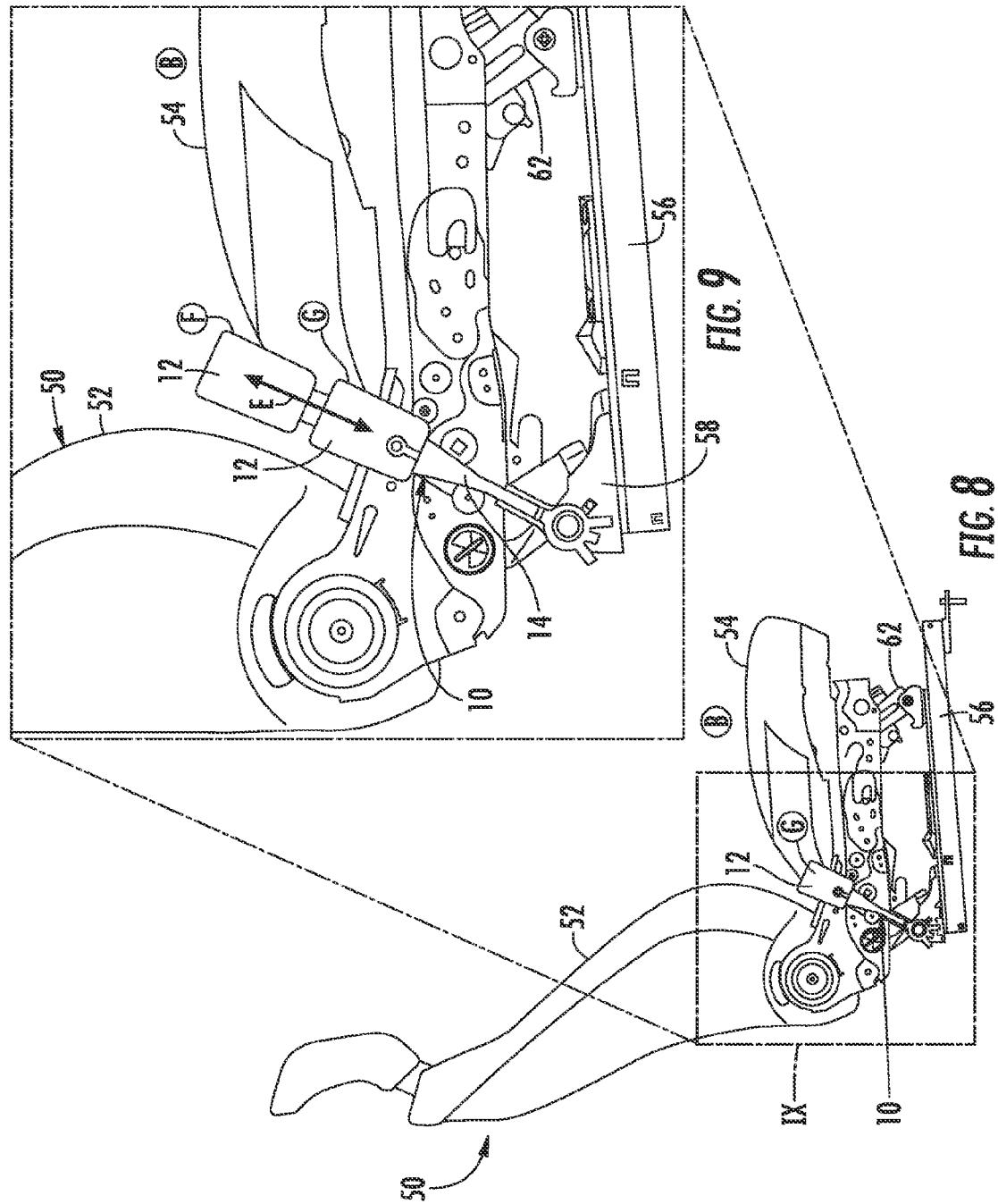

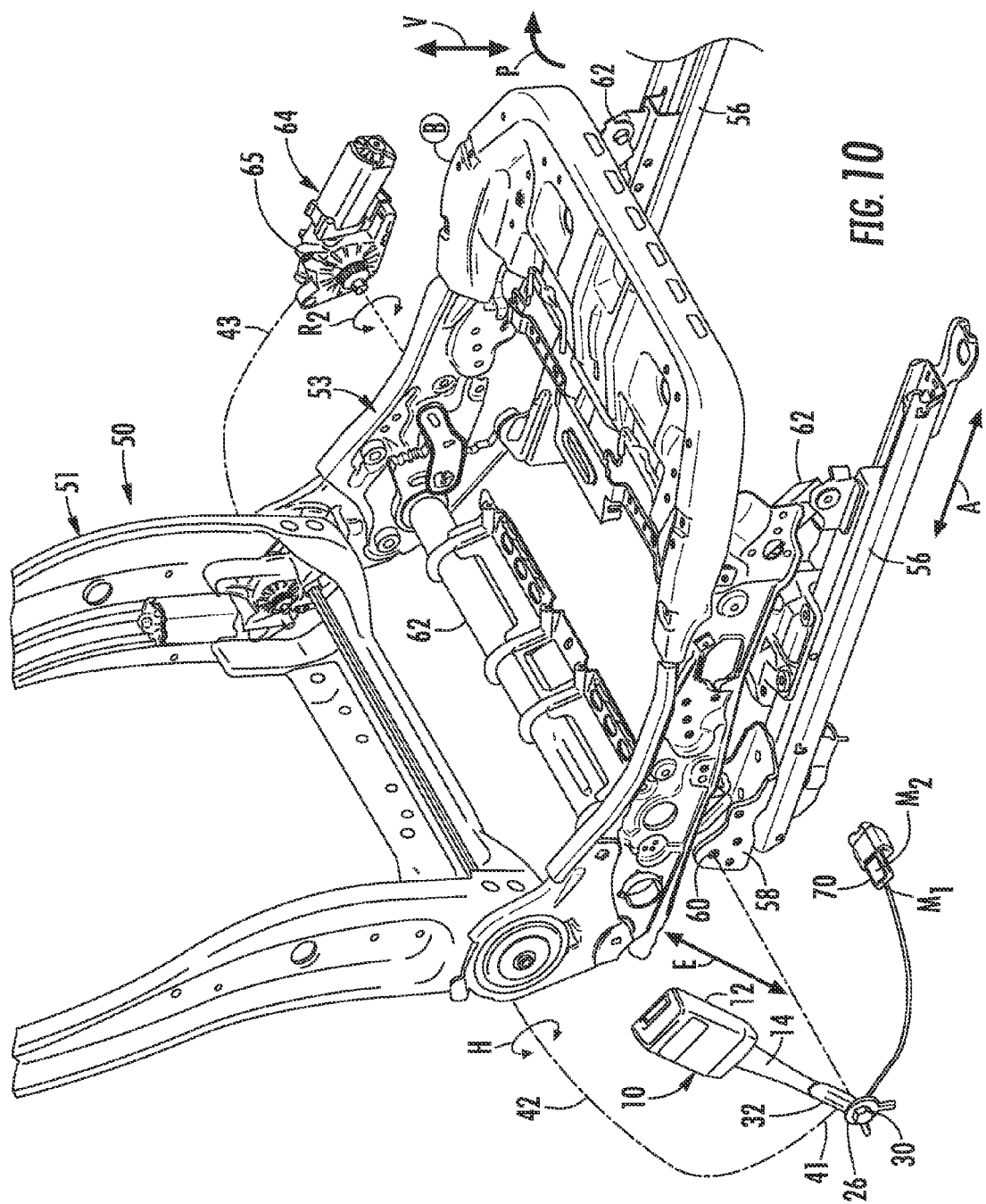

SEATBELT BUCKLE HEIGHT ADJUSTMENT MECHANISM

FIELD OF THE INVENTION

The present invention generally relates to a seatbelt height adjustment mechanism, and more specifically, to a telescoping seatbelt buckle assembly which is operably coupled to a motor adapted to adjust the height of a vehicle seat, such that the vehicle seat and the telescoping seatbelt buckle assembly are adjusted in a synchronized or simultaneous manner as a vehicle occupant adjusts the seat position.

BACKGROUND OF THE INVENTION

In an automotive vehicle, a seatbelt buckle is generally fixed in a length in relation to a vehicles seat. The fixed length seatbelt buckle can be coupled to a vehicle floor, or be coupled to a vehicle seat track such that the fixed length seatbelt buckle can move between fore and aft positions with the vehicle seat. Vehicle seats have evolved to include many different forms of seat position adjustments. Currently, vehicle seats are adapted to not only adjust in the fore and aft positions, but are further adapted to tilt, as well as raise and lower the seat pan to accommodate the needs of a vehicle user. With a fixed length seatbelt buckle assembly in place, the user has poor accessibility to the seatbelt buckle assembly when the vehicle seat is in a full up position. This is because the fixed length seatbelt buckle assembly, as coupled to a vehicle seat track or a vehicle floor, does not adjust in length in accordance with the vehicle seat position. Thus, while the seatbelt buckle may be readily accessible when the seat cushion is in a full down position, the same is not true when the vehicle seat cushion is in a full up position. The poor accessibility is particularly noticeable for smaller and older vehicle occupants, because they are more likely to adjust the seat height to near full up position.

Known telescoping buckle presenters use a variation of buckle pretensioner hardware which is modified to be driven by a dedicated motor to change the buckle length. This change in buckle length (or height) occurs independent of the vehicle seat adjustment typically with separate dedicated controller circuits and switches. This system "presents" (lengthens) the buckle beyond normally available length to make it accessible for easy buckling when an occupant first enters the vehicle. Then after the occupant buckles the seatbelt, the "presenter" shortens the buckle to a normal length. This system is significantly larger and heavier than conventional buckles, making it challenging to package in tight space between the seat and center floor console. It also bears significant cost due to the additional motor, electronics, control logic and switches. Thus, such a dedicated system requires complex control logic to determine when to extend and when to retract the buckle length for optimum crash performance.

Other buckle presenters are self adjusting using mechanical means such as a rack and pinion mechanism or other systems using a rigid or flexible strap mounted seatbelt buckle attached to a lower slider mechanism. An upper portion of the buckle is coupled mechanically to the seat pan. This self adjusting buckle presenter does not require any electrical controls or logic, but does require a mechanical "clutch" type mechanism to allow the buckle length adjustment with seat height adjustment, yet lock the buckle length adjustment when it is under load, such as in a collision event. In this system, the buckle length range is limited by the seat pan height adjustment, since it is directly attached to the seat pan for vertical travel therewith. This reinforcement of seat structure adds significant weight and cost to the seat assembly, thereby calling for a larger package than the typical static buckle it replaces.

Referring to FIG. 1, a fixed length seatbelt buckle 1 of the prior art is shown as coupled to a vehicle seat 2. Many common seat structures include a fixed length seatbelt buckle 1 having an anchorage 3 which is coupled to an upper track of the seat assembly 2. In this way, the fixed length seatbelt buckle 1 moves to fore and aft positions in a direction as indicated by arrow A as the position of the seat assembly 2 is adjusted. Further, referring to FIG. 2, the seat assembly 2 is adjustable vertically between a full up position B, as shown in FIG. 2, and a full down position C as indicated in FIG. 1. The seat assembly 2 moves between the full up position B and the full down position C in a direction as indicated by arrow D shown in FIG. 2. The ability of the vehicle seat 2 to move between positions B and C results in a minimal portion of the seatbelt buckle 1 being accessible when the seat height is in the full up position B as shown in FIG. 2. Accordingly, when the vehicle seat 2 is in the full down position C, the fixed length seatbelt assembly 1 is more accessible. In the configuration as shown in FIG. 2, the fixed length seatbelt is not only less accessible as compared to FIG. 1, but the position of the buckle 1 also degrades the overall comfort for the vehicle occupant when attempting to engage the seatbelt buckle 1.

Thus, there is a desire to provide a telescoping seatbelt buckle assembly that will adjust the seatbelt buckle length in accordance with the position of the vehicle seat, such that a relative position of the buckle to the seat is maintained in a full range of motion of a vehicle seat including, but not limited to, fore and aft positions, tilted positions, as well as raised and lowered seat positions.

SUMMARY OF THE INVENTION

According to one aspect of the present invention, a telescoping seatbelt buckle assembly includes a seatbelt buckle which is coupled to a drive mechanism, wherein the seatbelt buckle is operable between an extended position and a retracted position as driven by the drive mechanism. The telescoping seatbelt buckle assembly further includes a seat height adjustment motor which is coupled to the drive mechanism having a seat raising mode and a seat lowering mode. In assembly, the seatbelt buckle moves to the extended position when the seat height adjustment motor is in the seat raising mode, and the seatbelt buckle moves to the retracted position when the seat height adjustment motor is in the seat lowering mode. As such, the coupling of the seat adjustment motor to the drive mechanism ensures that the vehicle seat height and the telescoping seatbelt buckle assembly are synchronized such that the vehicle seat and the seatbelt buckle assembly move simultaneously or in concert to maintain a relative vehicle seat to seatbelt buckle position.

Another aspect of the present invention includes a telescoping seatbelt buckle assembly having a seatbelt buckle portion coupled to a drive mechanism. The drive mechanism is operable to move the seatbelt buckle between an extended position and a retracted position. A single actuator is coupled to the drive mechanism and a vehicle seat adjustment mechanism. The actuator has a seat raising mode for raising the vehicle seat and a seat lowering mode for lowering the vehicle seat. In assembly, the actuator is adapted to move the seatbelt buckle to the extended position when the actuator is in the seat raising mode, and is further adapted to move the seatbelt buckle to the retracted position in the seat lowering mode. Thus, the seatbelt buckle moves passively as the vehicle occupant adjusts the vehicle seat as dictated by the mode of the actuator to which the seatbelt buckle and the vehicle seat are operably coupled.

Yet another aspect of the present invention includes a telescoping seatbelt buckle assembly including a seatbelt buckle member coupled to a support member or anchorage. An actuator is coupled to the support member to move the support member between an extended position and a retracted position. The actuator is operable to control the position of a vehicle seat in assembly. The actuator is adapted to move the support member between the extended position and the retracted position as the actuator raises and lowers the vehicle seat respectively.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a front elevational view of the telescoping seatbelt buckle assembly of FIG. 3;

FIG. 4A is a side elevational view of the telescoping seatbelt buckle assembly of FIG. 3;

FIG. 5 is a side elevational view of the telescoping seatbelt buckle assembly of FIG. 3 as coupled to a vehicle seat;

FIG. 6 is a front elevational view of the telescoping seatbelt buckle assembly of FIG. 5;

FIG. 7 is a side elevational view of a seatbelt buckle assembly as coupled to an actuator power switch;

FIG. 8 is a side elevational view of a telescoping seatbelt buckle assembly coupled to a vehicle seat;

FIG. 9 is a side elevational view of the telescoping seatbelt buckle assembly shown in FIG. 8 taken at location IX showing relative movement of the seatbelt buckle assembly; and FIG. 10 is an exploded perspective view of a telescoping seatbelt buckle assembly, a vehicle seat frame, and a vehicle seat height adjustment motor.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIG. 5. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
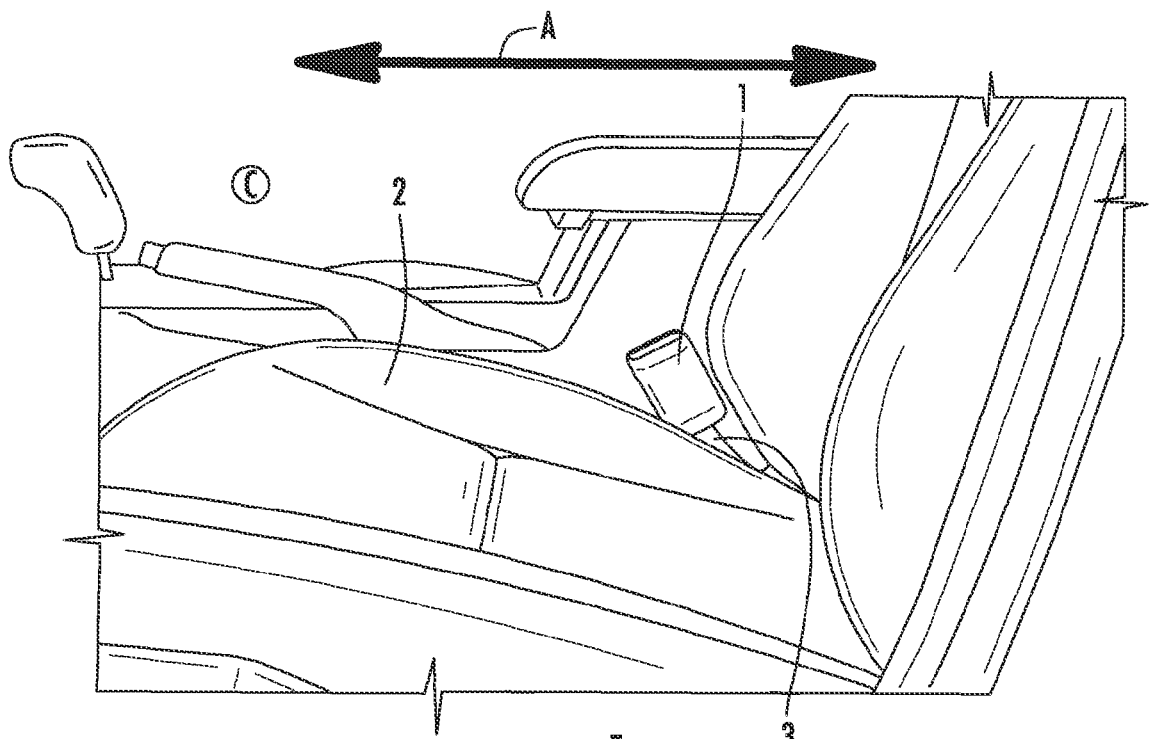
FIGS. 1-2 are side perspective views of a vehicle seat in a fixed length buckle assembly of the prior art.
Figure 2:
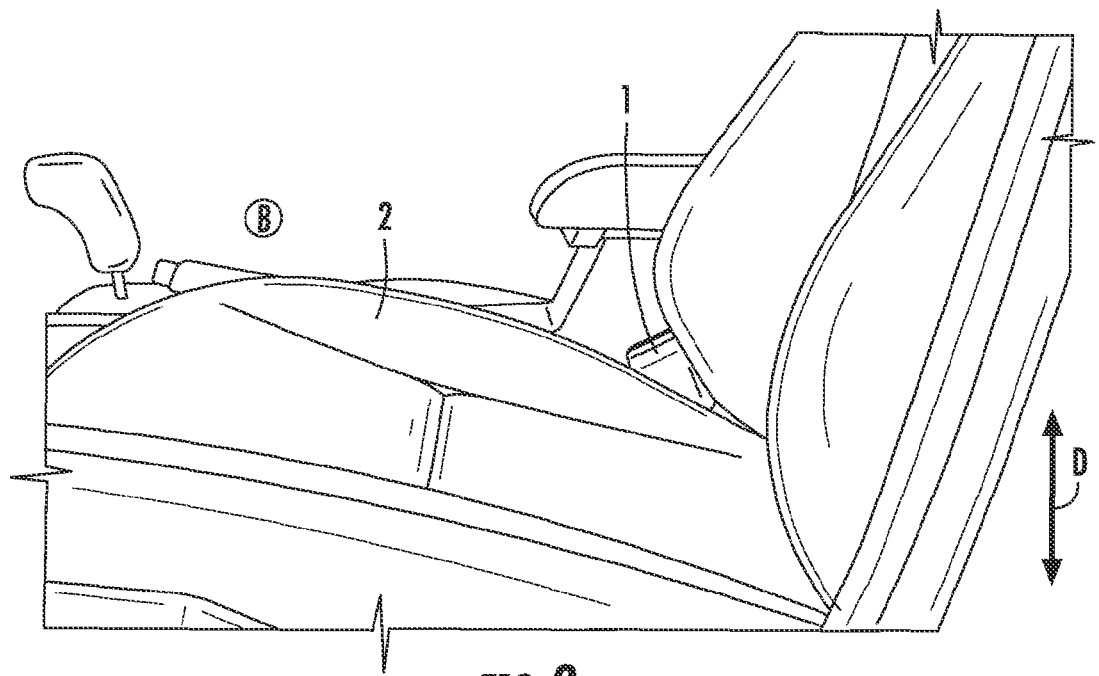
Figure 3:
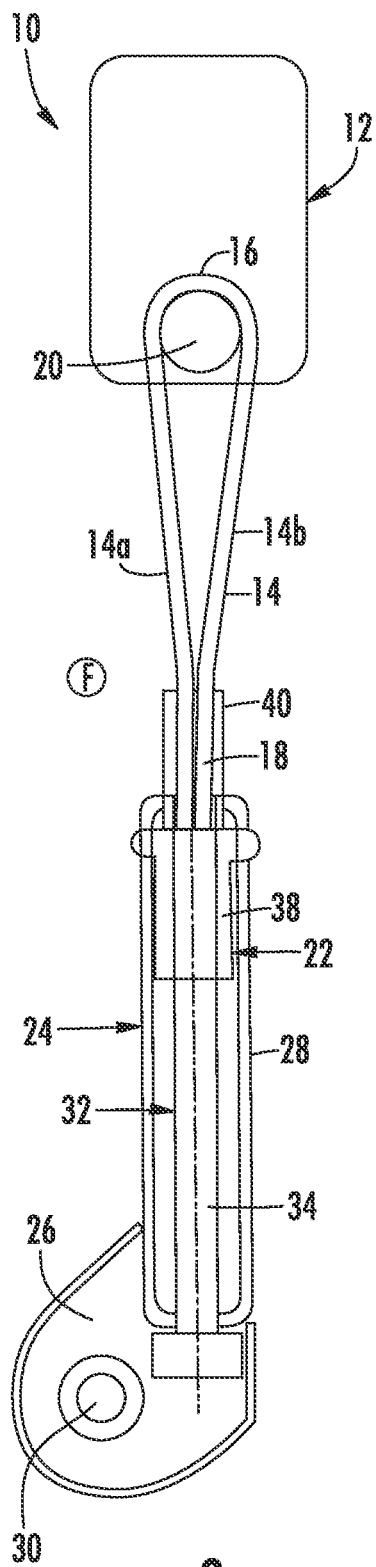
FIG. 3 is a side elevational view of a telescoping seatbelt buckle assembly in an extended position according to embodiments.

Referring now to FIGS. 3 and 4, the reference numeral 10 generally designates a telescoping seatbelt buckle assembly according to one embodiment of the present invention. The telescoping seatbelt buckle assembly 10 includes a seatbelt buckle portion or a buckle member 12. The seatbelt buckle 12 is coupled to a support member 14 having a first end 16 and a second end 18 wherein the first end 16 is coupled to the buckle member 12. The first end 16 of the support member 14 is coupled to the buckle member 12 at an engagement portion 20 disposed on the buckle member 12. The second end 18 of the support member 14 is coupled to a mounting bracket 22 as further described below. The support member 14 as shown in FIGS. 3 and 4 is a twin cable support assembly having cable supports 14a and 14b, wherein the support member 14 is adapted to support the buckle member 12 in a generally upright or forwardly angled upright position as shown in FIG. 5. It is noted that the twin cable support assembly 14 can also be a single cable assembly or any other support configuration adapted to support the buckle member 12. The telescoping buckle assembly 10, as shown in FIGS. 3 and 4 further includes a housing member 24 having a shaft housing portion 28 and an anchorage 26, wherein the anchorage 26 further includes an engagement aperture 30 which is adapted to pivotally couple the telescoping seatbelt buckle assembly 10 to a vehicle seat as further described below.

As shown in FIGS. 3 and 4, the telescoping seatbelt buckle assembly 10 includes a drive mechanism 32, wherein the drive mechanism 32 includes a drive shaft or screw member 34 coupled to the mounting bracket 22. The drive shaft 34, as shown in FIG. 4A, is in the form of a power screw or worm screw having threads 36 disposed thereon. The threads 36 are essentially a continuous thread extending along a length of the drive shaft 34. The drive mechanism 32 is generally concealed by the shaft housing 28 in assembly. The mounting bracket 22 includes a ferrule portion 38 and a support portion 40 to form a short strap ferrule member. In assembly, it is contemplated that the support member 14 of the seatbelt buckle 12 can couple to the support portion 40 of the mounting bracket 22. The ferrule portion 38 of the mounting bracket 22 is threaded in such a manner that the ferrule portion 38 mates with the threads 36 of the drive shaft or power screw 34. In this way, the ferrule portion 38 of the mounting bracket 22 serves as a threaded translation actuator and is moveable in a linear manner up and down along a length of the drive shaft 34 as indicated by arrow E between an extended position F, as shown in FIGS. 3, 4 and 4A, and a retracted position G shown in FIG. 3A.

Figure 3A:
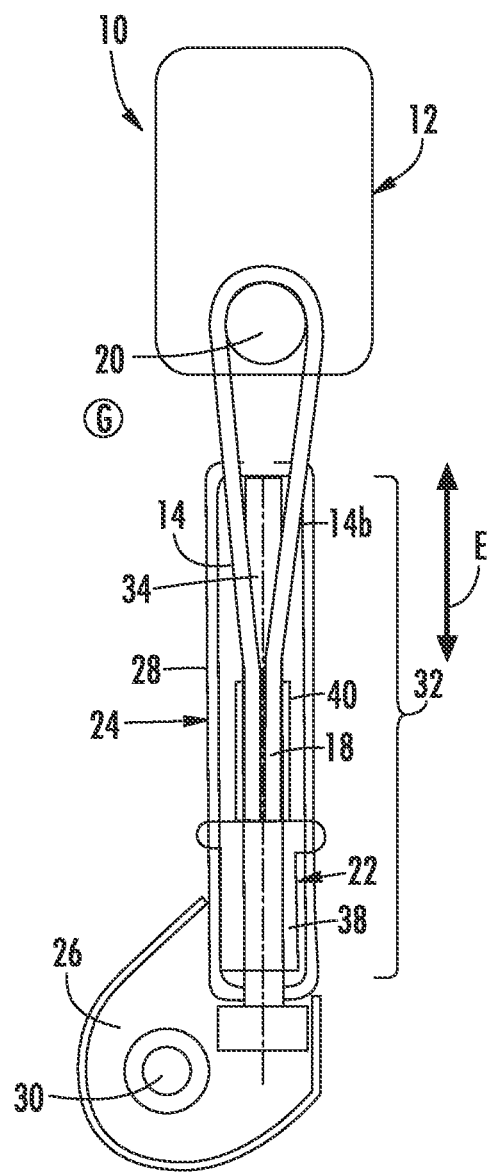
FIG. 3A is a side elevational view of a telescoping seatbelt buckle assembly in a retracted position according to embodiments.

As shown in FIG. 4A, a flexible shaft 42 is coupled to a motor as further described below. The flexible shaft 42 is designed to rotate as powered by the motor, wherein the flexible shaft 42 rotates in a direction as indicated by arrow H. The flexible shaft 42 is operably coupled with the drive shaft or power screw 34 of the drive mechanism 32, such that the drive shaft 34 also rotates in a direction as indicated by arrow H1. Thus, as the drive shaft 34 rotates, the threads 36 also rotate as matingly threaded with the ferrule portion 38 of the mounting bracket 22, such that the rotational torque from the motor is converted to a linear motion of the mounting bracket 22 indicated by arrow I along a length of the drive shaft 34 indicated by arrow E. Thus, the drive mechanism 32 comprises a drive shaft 34 and a mounting bracket or translation actuator 22, which are threadedly coupled, according to one embodiment of the present invention, such that the mounting bracket 22 does not rotate and therefore is capable of being extended and retracted axially as shown in FIGS. 3 and 3A by translating the rotational movement of the power screw 34 to axial or linear movement. The coupling of the mounting bracket 22 and the power screw 34 provides for a gear ratio that determines the movement of the buckle assembly 10 in use as further described below. The support member 14 and the seatbelt buckle assembly 12 are also moveable between extended and retracted positions as coupled to the mounting bracket 22.

Referring now to FIG. 5, the telescoping seatbelt buckle assembly 10 is shown coupled to a vehicle seat 50 wherein the vehicle seat 50 includes a seatback 52 and a seat cushion 54. The vehicle seat 50 is further coupled to a vehicle seat track assembly 56, which is coupled to the vehicle seat 50 in such a way that the vehicle seat 50 is moveable in a car forward direction and a car rearward direction, or fore and aft positions, as indicated by arrow A. In the embodiment show in FIG. 5, the vehicle seat track assembly 56 further includes an upward extending flange 58 having an engagement aperture 60 disposed thereon which is adapted to couple to the engagement aperture 30 of the anchorage 26 of the telescoping seatbelt buckle assembly 10, such that the telescoping seatbelt buckle assembly 10 is pivotally coupled to the vehicle seat track assembly 56 at the anchorage 26. Unlike other telescoping assemblies, the telescoping seatbelt buckle assembly 10 of the present invention does not need to have an upper portion coupled to the seat pan of the vehicle seat 50 in order to functionally telescope in assembly. As shown in FIG. 5, the telescoping seatbelt buckle assembly 10 is in a retracted position G and is pivotally coupled to the vehicle seat track assembly 56 such that the seat belt buckle member 12 can be positioned along an arc as indicated by arrow $R_1$. As shown in FIG. 5, the vehicle seat 54 is in a full down position C and the telescoping seatbelt buckle assembly 10 is in the retracted position G. Thus, as shown in FIG. 5, the seatbelt buckle portion 12 is readily accessible to the vehicle occupant even while in the retracted position G.

Referring now to FIG. 6, the telescoping seatbelt buckle assembly 10 is shown in the extended position F and the vehicle seat cushion 54 is shown in a full up position B. As shown in FIG. 6, due to the synchronized movement of the vehicle seat 50 and the telescoping seatbelt buckle assembly 10, the buckle portion 12 of the telescoping seatbelt buckle assembly 10 is readily accessible above a top surface of the seat cushion 54. As shown in FIGS. 5 and 6, the vehicle seat 50 includes a powered seat height adjustment mechanism 62 which is adapted to move the vehicle seat 50 vertically in a direction as indicated by arrow V. Further, it is contemplated that the powered seat height adjustment mechanism 62 can pivotally move the vehicle seat 50 in a direction as indicated by arrow P for making tilt adjustments, such that the overall position of the vehicle seat 50 is raised and lowered vertically by the seat height adjustment mechanism 62. As best shown in FIG. 5, the telescoping seatbelt buckle assembly 10 can be angled as coupled to the vehicle seat track assembly 56 such that the telescoping movement of the seatbelt buckle member 12 is an upward and car forward telescoping movement along a direction indicated by arrow E. In comparing FIGS. 5 and 6, it is noted that the telescoping seatbelt buckle assembly 10 of the present invention maintains a relative position in relation to the vehicle seat 50 as the vehicle seat 50 is adjusted. The relative position as used throughout this disclosure indicates that the seatbelt buckle 12 is visible and accessible in relation to the vehicle seat, and generally disposed slightly above the vehicle seat 50.

Referring now to FIGS. 8 and 9, the telescoping seatbelt buckle assembly 10 is shown coupled to a vehicle seat 50 on an upper engagement flange 58 of a vehicle seat track assembly 56. As shown in FIG. 9, the telescoping seatbelt buckle assembly 10 is moveable in a direction as indicated by arrow E between an extended position F and a retracted position G. In FIG. 8, the telescoping seatbelt buckle assembly 10 is shown in the retracted position G while the vehicle seat 50 is in a full up position B. Thus, the seatbelt buckle portion 12 is not as easily accessible to the vehicle occupant. As such, a synchronized movement between the vehicle seat 50 and the telescoping seatbelt buckle assembly 10 is desired as described with reference to FIG. 10.

As shown in FIG. 10, the vehicle seat 50 is shown having a seatback frame 51 and seat portion frame 53. The seat height adjustment mechanism 62 is shown coupled to the left and right vehicle seat track assemblies 56 on an upper track portion thereof. In FIG. 10, the telescoping seatbelt buckle assembly 10 is shown exploded away from the upper engagement flange 58 of the vehicle seat track assembly 56. The attachment of the telescoping seatbelt buckle assembly 10 to the vehicle seat track assembly 56 ensures that the telescoping seatbelt buckle assembly 10 will move in a synchronized manner or in concert with the vehicle seat 50 between fore and aft positions along a direction as indicated by arrow A. In order to fully provide uniform movement of the telescoping seatbelt buckle assembly 10 with all positional changes of the vehicle seat 50, the telescoping seatbelt buckle assembly 10 must also move in concert or simultaneously with the vehicle seat 50 as the vehicle seat 50 is adjusted vertically in a direction as indicated by arrow V or pivotally as indicated by arrow P by the vehicle occupant. As shown in FIG. 10, a seat height adjustment motor 64 is shown exploded away from the vehicle seat 50. In assembly, it is contemplated that the vehicle seat height adjustment motor 64 couples to the vehicle seat height adjustment mechanism 62 to power the height adjustment mechanism 62. The motor 64 provides a rotational torque $R_2$ to the vehicle seat height adjustment mechanism 62, such that the height adjustment mechanism 62 pivotally raises and lowers the vehicle seat 50 within a vehicle interior. Further, the motor 64 is contemplated to adjust the tilt of the vehicle seat 50 using the adjustment mechanism 62. The vehicle seat height adjustment motor 64 is essentially a vehicle seat position motor or actuator that can be adapted to move the vehicle seat 50 in any number of directions including fore and aft positions. The motor or actuator 64 is shown in FIG. 10 as an electric motor having a rotor 65 which is coupled to the vehicle seat adjustment mechanism 62. The rotor 65 is further coupled to flexible shaft 42 to provide a torque or rotary force to the flexible shaft 42. This dual coupling provides for movement of the vehicle seat 50 and the telescoping seatbelt buckle assembly 10 using a single actuator 64. As an actuator, the vehicle seat height adjustment motor 64 is adapted to convert an electric signal or an input signal into a rotary motion $R_2$. This rotary motion is translated to the rotational movement H of the flexible shaft 42, as shown in FIG. 4A, and the rotational movement H1 of the power screw 34. Acting as a threaded translation actuator, the mounting bracket 22, which is threadedly engaged or mated with the power screw 34, is used as a bolt and screw transducer mechanism to transform the circular or rotational movement of the power screw 34 into linear motion of the mounting bracket 22. The threadedly coupled power screw 34 and mounting bracket 22 provides for a structural load path through the power screw 34 that is always engaged. This constant engagement eliminates the need for an additional clutch mechanism needed in other telescoping buckle assemblies to keep the buckle assembly in place during a collision event, and therefore eliminates a potential point of failure that other assemblies must deal with in a collision event.

Since the optimal buckle height or position corresponding to a given seat height adjustment setting (i.e., full up, mid or full down) depends on several constraints (such as vehicle specific package, performance, and regulatory requirements), it is desired that a suitable gear ratio between the power screw 34 and the mounting bracket 22 will be pre-selected or predetermined and set at the manufacturing facility. A vehicle occupant will not be able to adjust the seatbelt buckle length (height) independent of the vehicle seat 50. Thus, the present invention can be configured by the manufacturer to provide a buckle length adjustment range that may be more, equal to, or less than the seat height adjustment range of a particular vehicle seat 50. In most applications, it is contemplated that the relative position between the buckle 12 and the vehicle seat 50 will remain constant as a vehicle occupant adjusts the vehicle seat 50. However, as noted above, the buckle length range can be adjusted as needed to travel greater or less than the seat height travel range by changing the gear ratio between the seat motor 64 and the buckle telescoping mechanism 10. Thus, by adjusting the predetermined gear ratio defined by the coupling of the threaded translation actuator 22 to the threaded screw member 34, the predetermined gear ratio can move the support member 14 between the extended and refracted positions according to a buckle length range, wherein the buckle length range is adapted to be greater than, less than or equal to a range of vertical travel of the vehicle seat 50.

As noted above and shown in FIG. 10, a flexible shaft 42 is coupled at a first end 41 to the telescoping seatbelt buckle assembly 10, and further coupled at a second end 43 to the seat height adjustment motor 64. The flexible shaft 42 is contemplated to have a cable, or other like apparatus, disposed within a housing that carries a rotational force or torque indicated by arrow H to the telescoping seatbelt buckle assembly 10. The flexible shaft 42, as shown in FIG. 4A, is coupled to the drive shaft 34 of the drive mechanism 32 such that the drive shaft 34 rotates in the direction as indicated by arrow H1. This rotational movement H1 translates into a linear movement I of the mounting bracket 22 along a length of the drive shaft 34 as indicated by arrow E in FIG. 4A by the mating engagement of the ferrule portion 38 of the mounting bracket 22 with drive shaft 34.

As shown in FIG. 10, a switch mechanism 70 is coupled to the seat height adjustment motor 64. The switch mechanism 70 can have multiple modes or inputs for controlling the motor 64, including but not limited to, a first mode $M_1$ and a second mode $M_2$, wherein it is contemplated that the first mode $M_1$ is a seat raising mode and the second mode $M_2$ is a seat lowering mode. Thus, the switch 70 is operable between a seat raising mode and a seat lowering mode such that the vehicle seat height adjustment motor 64 can raise and lower the vehicle seat 50 using adjustment mechanism 62 according to the input received from the switch 70. Depending on the input received from the switch 70, the seat height adjustment motor 64 rotates in one of two ways along the rotational direction as indicated by arrow $R_2$. This rotational movement of the seat height adjustment motor 64 further correlates to the rotational movement of the flexible shaft 42 in one of two directions indicated by arrow H. As such, the telescoping seatbelt buckle assembly 10 is adapted to move towards the extended position F when the first mode $M_1$ is selected thereby maintaining a relative position of the seatbelt buckle member 12 to the vehicle seat 50 while the vehicle seat 50 is raised and the seatbelt buckle member 12 is extended. Further, the telescoping seatbelt buckle assembly 10 is adapted to move to the retracted position G as the input for the second mode $M_2$ is selected on the switch 70, such that the seat height adjustment motor 64 lowers the vehicle seat 50 simultaneously with the movement of the telescoping seatbelt buckle assembly 10. Therefore, as a vehicle occupant raises and lowers the vehicle seat 50 between raised and lowered positions B, C using the power seat adjustment control switch 70, the telescoping seatbelt buckle assembly 10 passively moves simultaneously in a synchronized manner with the vehicle seat 50, thereby maintaining a relative and optimum position of the buckle portion 12 of the telescoping seatbelt buckle assembly 10 relative to a vehicle seat 50 for maximizing accessibility and comfort for the vehicle occupant.

Therefore, as an occupant raises and lowers the vehicle seat 50 using the power seat adjustment control 70, the buckle assembly 10 moves in sync with the vehicle seat 50, maintaining the optimum relative position for accessibility and comfort. In this way, the vehicle occupant does not actively adjust the buckle height, rather when the vehicle occupant adjusts the seat height using the seat height adjustment controls (switches) 70, the telescoping seatbelt buckle assembly 10 adjusts the buckle length (or height) passively according to a preset gear ratio, and maintains the optimal buckle height that corresponds to the given seat height adjustment setting selected by the vehicle occupant.

The telescoping seatbelt buckle assembly 10 disclosed herein provides a much smaller size and lighter weight package as compared to other known telescoping buckle assemblies. In fact, the telescoping seatbelt buckle assembly 10 of the present invention can be packaged in nearly the same environment as a fixed length seatbelt buckle. Since the telescoping seatbelt buckle assembly 10 of the present invention also shares the power source and control electronics with the existing seat adjustment motor parts, the incremental cost of providing the present invention in a current vehicle is significantly lower than the other solutions known in the art.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A telescoping seatbelt buckle assembly, comprising:
   a seatbelt buckle;
   a drive mechanism configured to move the seatbelt buckle between extended and retracted positions, and further including seat raising and seat lowering modes; and
   a seat height adjustment motor having a rotor coupled to the drive mechanism by a flexible shaft, wherein the seatbelt buckle moves to the extended position in the seat raising mode and to the retracted position in the seat lowering mode.

2. The telescoping seatbelt buckle assembly of claim 1, wherein:
   the drive mechanism includes a threaded screw member coupled to the flexible shaft.

3. The telescoping seatbelt buckle assembly of claim 2, wherein:
   the drive mechanism further includes a threaded translation actuator having a support portion, wherein the threaded translation actuator is threadedly coupled to the threaded screw member, and further wherein the support portion is coupled to the seatbelt buckle.

4. The telescoping seatbelt buckle assembly of claim 3, wherein:
   the threaded translation actuator is operable to axially translate in response to rotation of the flexible shaft by the rotor of the seat height adjustment motor.

5. The telescoping seatbelt buckle assembly of claim 1, wherein:
   the seat height adjustment motor is coupled to a vehicle seat adjustment mechanism adapted to adjust a position of a vehicle seat, wherein the vehicle seat is raised in the seat raising mode as the seatbelt buckle moves to the extended position, and further wherein the vehicle seat is lowered in the seat lowering mode as the seatbelt buckle moves to the refracted position, such that a relative position between the seatbelt buckle and the vehicle seat is maintained during adjustment of the position of the vehicle seat.

6. The telescoping seatbelt buckle assembly of claim 5, including:
a vehicle seat track adapted to move the vehicle seat between fore and aft positions, wherein, the seatbelt buckle is coupled to the vehicle seat track at an anchorage, such that the seatbelt buckle moves between fore and aft positions with the vehicle seat.

7. A telescoping seatbelt buckle assembly, comprising
a seatbelt buckle coupled to a drive mechanism, wherein the drive mechanism is operable to move the seatbelt buckle between an extended position and a retracted position; and
a single actuator coupled to the drive mechanism and a vehicle seat adjustment mechanism of a vehicle seat, the actuator having a seat raising mode for raising the vehicle seat and a seat lowering mode for lowering the vehicle seat, wherein the actuator is adapted to move the seatbelt buckle to the extended position in the seat raising mode, and further wherein the actuator is adapted to move the seatbelt buckle to the retracted position in the seat lowering mode, whereby the vehicle seat and the seatbelt buckle move simultaneously as coupled to the actuator to maintain a relative position between the seatbelt buckle and the vehicle seat, and further wherein the single actuator includes a rotor coupled to the drive mechanism by a flexible shaft.

8. The telescoping seatbelt buckle assembly of claim 7, wherein:
the drive mechanism includes a threaded screw member coupled to the flexible shaft.

9. The telescoping seatbelt buckle assembly of claim 8, wherein:
the drive mechanism further includes a threaded translation actuator having a support portion, wherein the threaded translation actuator is threadedly coupled to the threaded screw member, and further wherein the support portion is coupled to an anchorage of the seatbelt buckle.

10. The telescoping seatbelt buckle assembly of claim 9, wherein:
the threaded translation actuator is operable to axially translate in response to rotation of the flexible shaft by the rotor of the single actuator.

11. The telescoping seatbelt buckle assembly of claim 10, wherein:
the anchorage is pivotally coupled to a vehicle seat track adapted to move the vehicle seat between fore and aft positions.

12. A telescoping seatbelt buckle assembly, comprising:
a seatbelt buckle coupled to an anchorage;
an actuator coupled to a support member to move the support member between extended and retracted positions, the actuator having a rotor coupled to a drive mechanism by a flexible shaft for controlling the position of a vehicle seat; and
wherein the actuator moves the support member between the extended and retracted positions as the actuator raises and lowers the vehicle seat.

13. The telescoping seatbelt buckle assembly of claim 12, wherein:
the drive mechanism includes a threaded screw member coupled to the flexible shaft.

14. The telescoping seatbelt buckle assembly of claim 13, wherein:
the drive mechanism further includes a threaded translation actuator having a support portion, wherein the threaded translation actuator is threadedly coupled to the threaded screw member to define a predetermined gear ratio, and further wherein the support portion is coupled to the anchorage.

15. The telescoping seatbelt buckle assembly of claim 14, wherein:
the threaded translation actuator is operable to axially translate in response to rotation of the flexible shaft by the rotor of the actuator to move the anchorage between the extended and retracted positions.

16. The telescoping seatbelt buckle assembly of claim 14, wherein:
the predetermined gear ratio is adapted to move the anchorage between the extended and refracted positions according to a buckle length range, wherein the buckle length range is adapted to be greater than, less than or equal to a range of vertical travel of the vehicle seat.

17. The telescoping seatbelt buckle assembly of claim 12, wherein:
the anchorage is pivotally coupled to a vehicle seat track adapted to move the vehicle seat between fore and aft positions.

* * * * *